United States Patent Office 3,440,154
Patented Apr. 22, 1969

3,440,154
ELECTROLYTIC REDUCTIVE COUPLING OF OLEFINIC COMPOUNDS
Manuel M. Baizer, St. Louis, Mo., assignor to Monsanto Company, St. Louis, Mo., a corporation of Delaware
No Drawing. Filed May 2, 1966, Ser. No. 546,581
Int. Cl. C07b 1/00
U.S. Cl. 204—73
16 Claims This invention relates to electroorganic syntheses involving electrolytic reductive coupling of olefinic compounds.

A general object of the present invention is the provision of a process for adding various aliphatic groups to the olefinic bond of an olefin. A further object is the provision of a process for adding moieties bearing functional groups to an olefinic double bond.

The present process involves electrolysis of a phosphonium or sulfonium compound to cause an aliphatic group to become detached from said compound and to become bonded to one of the olefinic carbon atoms of an olefinic reactant. The process is especially concerned with electrolyses of phosphonium or sulfonium compounds bearing an aliphatic substituent containing a functional group in a solution containing olefins having a olefinic bond activated by being in $\alpha$, $\beta$-position with respect to an activating group.

The phosphonium or sulfonium salts for use herein can be represented:

$$Z^+\text{---}CR_2\text{---}A^-X$$

in which Z is the residue of the phosphonium or sulfonium ion, R is hydrogen or A, X is an anion, and A is an organic moiety. As is apparent from the objects discussed above, the present process requires that the electrolysis cleave the bond between Z and $CR_2$, and therefore the phosphonium and sulfonium groups should be such as are conducive to such cleavage under the electrolysis conditions employed. The present process is a reductive reaction occurring at the cathode and, in the case of the phosphonium ion, aryl substitutes to occur at relatively low, i.e. less negative, cathode voltages; with the sulfonium ion, the substituents on the sulfur are generally alkyl groups or substituted alkyl groups, preferably those of up to 6 carbon atoms. A in the above formula generally includes some functional groups for incorporation into the product, and some functional groups are also advantageous in promoting cleavage of the carbon to phosphorus or carbon to sulfur bond, particularly if only 1 to 2 methylene groups separate the functional groups from the phosphorus or sulfur atom. A can be an alkyl group, which generally has no activating effect, or such groups as carbalkoxy, carbaryloxy, cyano, carboxamido, keto, aldehyde, aryl, phosphonato, phosphianato, phosphine oxide, sulfone, etc. groups; or any of the foregoing groups attached to alkylene groups, providing additional aliphatic carbon atoms between the functional group and the phosphorus or sulfur atom, as illustrated:

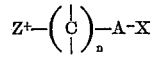

where Z, A and X have the meaning given above, and $n$ is an integer from 1 to, for example, 10, with the activating groups having a particular effect upon cleavage proclivities when $n$ is 1 or 2.

The anion X in the above ionic compounds is unimportant so long as it does not unduly interfere in the desired electrolysis reaction by being oxidized or reduced under the electrolysis conditions or otherwise react with some of the components of the reaction system in a manner to prevent the desired reaction. Therefore X can be practically any anion, but such common anions as the halides can conveniently be employed. To enhance solubility of the compounds, particularly if an aqueous medium is employed for the electrolysis, aromatic sulfonate or alkylsulfate anions are frequently employed. The anion can be a hydroxyl anion, although with some reactants excessive alkalinity may cause hydrolysis of ester groups or other undesired side reactions. The phosphonium and sulfonium salts are capable of serving as electrolytes to carry electric current and therefore can be the sole electrolyte in the electrolysis system. However, it is frequently desired to employ the phosphonium or sulfonium salts in small quantities in order to promote the desired reaction, and therefore such salts are generally accompanied by supporting electrolyte salts, i.e. salts which do not discharge under the electrolysis conditions. As supporting electrolyte it is generally desirable to employ salts having cations (and anions) which discharge only at cathode voltages substantially more negative than that at which the electrolysis occurs, the quaternary ammonium cation, for example, being particularly suitable in this regard. In general the process is operative so long as the required cathode potential is attained, regardless of what salts are present in addition to the phosphonium an sulfonium salts. The alkali metal ions, for example, discharge more readily, i.e. at less negative cathode potentials, than quaternary ammonium ions and therefore are not particularly recommended for use, but can nevertheless be employed when the phosphonium or sulfonium compound involved will discharge in their presence as when the phosphonium or sulfonium compounds discharge at the same, or preferably, substantially less negative potentials.

The present invention involves a process in which the aliphatic substituent in the phosphonium or sulfonium cations described above is added to an olefinic bond. There is evidence that the cleavage of the phosphonium and sulfonium groups involves a two-electron uptake with production of a carbanion from the aliphatic radical, and such carbonion can then add to any olefin capable of serving as acceptor in the well known Michael reaction, olefins represented, for example, by $R_2C=CR\text{---}A$, in which A has the definition given above, and the R's are hydrogen or organic radicals, particularly lower alkyl or aryl radicals. However this does not preclude the production of free radicals from the aliphatic substituents on the phosphonium or sulfonium salts, and such free radicals are capable of adding to olefins in general, including such unsubstituted olefins as ethylene. Thus the reaction of the present invention can be represented:

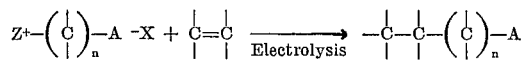

in which Z, $n$, A and X have the meanings given hereinabove.

The aliphatic addend can add on either or both carbon atoms of the olefinic groups, and this addition can be accompanied by dimerization or other reactions of the olefins to give, for example, dimeric compounds having one or more aliphatic groups as substituents. However the process is particularly suited for addition of the aliphatic group to the $\beta$-carbon atom of an olefinic group in $\alpha,\beta$-position with respect to an activating group, with addition of a hydrogen atom to the $\alpha$-carbon atom to saturate the olefinic bond. The reaction can be represented:

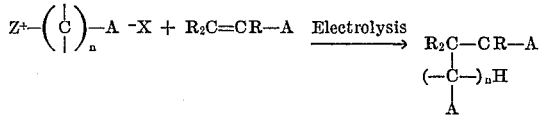

in which Z, $n$, A, X and R have the same meanings as given hereinabove and in which individual A's and R's can be the same or can differ from each other. More specific examples of the reaction can be represented:

[(C₆H₅)₃P⁺CH₂COOC₂H₅]⁻X + CH₂=CHCN $\xrightarrow{\text{Electrolysis}}$
(C₆H₅)₃P + NCCH₂CH₂CH₂COOC₂H₅

[(CH₃)₂S⁺CH₂CN]CH₃—C₆H₅—SO₃⁻ + CH₂=CHCN $\xrightarrow{\text{Electrolysis}}$
(CH₃)₂S + NCCH₂CH₂CH₂CN In the illustrated reactions, the hydrogen added to the double bond comes from water or some other source of protons present in the reaction system. Since the process involves addition of electrons to produce an aliphatic addend which becomes coupled to an olefin molecule, it is referred to as a reductive coupling.

In effecting the reaction of the present invention it is necessary to obtain the cathode voltage necessary to add electrons to the phosphonium or sulfonium compound to cause cleavage of the aliphatic group therefrom, and therefore no materials should be present in the electrolysis solution which would prevent the attainment of such voltage. For this reason the olefinic compounds employed herein generally will not discharge at less negative voltages than the phosphonium or sulfonium cations, and, in fact, preferably discharge only at substantially more negative voltages, the voltages being those under the electrolysis conditions employed, as measured against a saturated calomel electrode. All of the cathode voltage values in the present application are with reference to the saturated calomel electrode. Aside from the matter of attaining the voltages necessary for cleavage of the phosphonium or sulfonium cations, olefins which reduce at less negative values are subject to hydrodimerization reactions which will adversely affect the yield of product involving addition of the aliphatic group, although in some cases the resulting hydrodimer will be a useful and desirable concomitant product. Acrylonitrile, which is a good acceptor, discharges circa —1.9 cathode volts and the following are the cathode reduction potentials of some other representative olefins which can be used as acceptors:

| Monomer | −E vs. Saturated Calomel Electrode |
|---|---|
| CH₂=C(CH₃)—CN | 1.81 to 1.91. |
| CH₃CH=CHCN | 2.08 to 2.11. |
| (CH₃)₂C=CHCN | 2.01 to 2.05. |
| (CH₃)₂C=C(CH₃)—CN | ca. 2.15. |
| C₆H₅CH=CHCN | 1.42 to 1.60. |
| NCCH=CHCN | 1.00 to 1.03. |
| CH₂=CH—CH=CHCN | 1.42 to 1.50. |
| 1-cyano-cyclohex-1-ene | 2.15 to 2.20. |
| 1-cyano-cyclopent-1-ene | 2.13. |
| CH₂=CHCOOEt | 1.85. |
| Me₂C=CHCOOEt | 2.10 to 2.18. |
| C₆H₅CH=CHCOOEt | 1.57 to 1.61. |
| C₂H₅OCH=CHCOOEt | 2.22. |
| EtOOCCH=CHCOOEt | 1.32 to 1.40. |
| C₈H₁₇OOCCH=CHCOOC₈H₁₇ | 1.41. |
| C₄H₉OOCCH=CHCOOC₄H₉ | 1.30. |
| C₁₈H₃₇OOCCH=CHCOOC₁₈H₃₇ | 1.22. |

| Monomer | −E vs. Saturated Calomel Electrode |
|---|---|
| C₆H₅CH=C(COOEt)₂ | 1.38 to 1.47. |
| CH₃CH=C(COOEt)₂ | 1.41 to 1.68. |
| CH₃CH=CH—CH=CHCOOEt | 1.50 to 1.59. |
| CH₂=CHCONEt₂ | 1.91 to 1.95. |
| CH₃CH=CHCONEt₂ | 2.03 to 2.12. |
| CH₂=CHCONH₂ | 1.82 to 2.00. |
| C₆H₅CH=CHCONEt₂ | 1.67 to 1.73. |
| C₆H₅CH=CHCOCH₃ | 1.29. |
| (CH₃)₂C=CHCOCH₃ | 1.58 to 1.73. |

Values for various other olefins are available in the literature, and in particular polarographic reduction values are available for many olefins. In carrying out the present process with, for example, (C₆H₅)₃P⁺CH₂CNBr⁻, which discharges at about −1.51 volts (as measured in dimethylformamide), one would ordinarily react it only with olefins having more negative discharge potentials, such as those in the above table in which the numerical value is greater than about 1.51. Similarly, (CH₃)₂S⁺CH₂CNCH₃C₆H₅SO₃⁻ discharges at −1.10 cathode volts (as measured in dimethylformamide) and would ordinarily be employed only with olefins discharging at more negative values, most of those in the above table being suitable. The following table gives reduction potentials (with tetrabutylammonium bromide as supporting electrolyte) for some representative phosphonium and sulfonium salts.

| Cation | Anion | −E 1/2 | Solvent |
|---|---|---|---|
| (C₆H₅)₃PCH·CN | Brom degg | 1.51 | Dimethylformamide. |
| (C₆H₅)₃P(CH₂)₂CN | do | 1.79 | Do. |
| (C₆H₅)₃P(CH₂)₂CN | p-Toluenesulfonate | 1.75 | Do. |
| (C₆H₅)₃P(CH₂)₂CN | do | 1.83 | 50% ethanol. |
| (C₆H₅)₃P(CH₂)₃CN | Brom degg | 1.84 | Dimethylformamide. |
| (C₆H₅)₃P(CH₂)₄CN | do | 1.86 | Do. |
| (C₆H₅)₃P(CH₂)₃CH₃ | do | 1.88 | Do. |
| (CH₃)₂SCH₂CN | p-Toluenesulfonate | 1.10 | Do. |
| (CH₃)₂S(CH₂)₃CN | do | 1.80 | Do. |

In view of the present disclosure one could select salts from the above table for electrolysis with olefins from the other table above to produce products resulting from addition of the aliphatic substituent to the olefin. The table immediately above also illustrates the effect of methylene groups intervening between the phosphorus or sulfur atom and the activating group, as well as the fact that an alkyl group containing no activating group can be employed as the aliphatic group and the cation will discharge at a value low enough for use in the present invention. It should be noted that discharge potentials are affected by various components in the electrolysis solution and that phosphonium and sulfonium salts will frequently discharge at substantially less negative values than those reported above, making it possible to utilize them in reductive couplings with olefins which might appear to discharge too readily; it is the discharge valves under the electrolysis conditions employed which are to be considered in determining suitability of particular pairs of olefins and sulfonium or phosphonium compounds. It is preferred that the phosphonium or sulfonium compound discharge and the electrolysis be effected at a cathode potential differing by being at least 0.3 volt less negative than the potential at which the olefin discharges under the electrolysis conditions. The reductive coupling process is presumed to involve discharge, i.e. addition of electrons, to the phosphonium or sulfonium compound and not to require any discharge of the olefinic compound; hence it is unnecessary to attain the cathode potentials required for discharge of the olefinic compound. It should be noted however that the reductive coupling described herein occurs, regardless of what the mechanism may be, and the invention is not to be limited by any particular theory of its mechanism.

The concentrations of components in the electrolysis medium can vary considerably, but there will generally be at least 5% by weight of the phosphonium or sulfonium compound, and at least 5% by weight of the olefin. While a supporting electrolyte is not required, if employed it will generally constitute at least 5% by weight of the electrolysis medium and frequently up to 20 or 30% by weight and can even constitute 50% or more by weight of such medium. The olefin compound can be employed in large amounts, and can often serve as solvent as well as reactant in the electrolysis; it is generally preferred to employ high concentrations of the olefin in order to have it present for reaction with the aliphatic groups generated by decomposition of the phosphonium or sulfonium compounds; it is preferred that at least 5 mols of olefin be present for each mol of phosphonium or sulfonium compound and 5 to 50 or more mols of olefin are usually employed for each mol of phosphonium or sulfonium compound. Water or other polar solvents can also be present, although in some reductive couplings it is preferred to employ anhydrous media to avoid protonation of intermediates. However, water serves as a proton source for saturation of the intermediates obtained upon addition of an aliphatic addend to an olefin, and the presence of some water is at times advantageous in minimizing production of polymers or other concomitant products. The amount of water can vary greatly, but water is frequently employed in amounts up to 10% or so by weight of the electrolysis solution, although much higher amounts can be employed. Water is also useful in increasing conductivity of the electrolysis medium. Such solvents as dimethylformamide can conveniently be used, particularly if the reactants do not form a homogeneous solution in the desired proportions in the absence of a mutual solvent. Such solvents as acetonitrile also serve as proton donors, although not as effectively as water in this regard.

In general any cathode and anode material can be employed in the electrolysis cell employed for the present invention. As the reduction occurs at the cathode, the anode material actually has little influence on the reaction. For the cathode it is preferred to use a material having a hydrogen overvoltage greater than that of copper, such materials as lead and mercury being particularly suitable. However stainless steel or materials of low hydrogen overvoltage such as platinum can be employed. The electrolysis is preferably conducted in a divided cell in order to minimize undesirable reactions possibly occurring at the anode, but an undivided cell can be employed. A porous diaphragm is useful as a cell divider, the types used in electrolysis cells being generally known. Ion exchange membranes are especially suitable for such purpose, particularly those selective for cations and referred to as cationic perm-selective membranes.

During electrolysis in a divided cell, alkalinity increases in the catholyte. However the anolyte becomes acidic. When a porous diaphragm is used to separate the catholyte from the anolyte, the alkalinity of the catholyte will depend upon the rate of diffusion of acid from the anolyte through the porous barrier. Control of alkalinity in the catholyte may thus be realized by purposely leaking acid from the anolyte into the catholyte. It can also be achieved by extraneous addition to the catholyte of an acid material, e.g. glacila acetic acid, phosphoric acid, sulfuric acid etc. It is generally preferable to utilize mildly alkaline conditions for the electrolysis, e.g. from about pH 7 to pH 9.5, in order to minimize side reactions, such as hydrolysis of ester groups or other groups, cyanoethylation reactions if acrylonitrile is present, etc. Acid conditions can also produce side reactions resulting from protonation of intermediates, as well as a tendency to polymerization in some instances. However pH's of 5 or 6 will generally be suitable, and lower pH's can also be employed. It will be recognized that the pH may have limited significance when anhydrous systems or those having very small amounts of water are under consideration and moreover that small amounts of acid may serve as a useful source of proton for completing the reduction of the coupled product. If desired, polymerization inhibitors such as hydroquinone or p-nitrosodimethylaniline can be included in the electrolysis medium. Further description of electrolytes, electrolysis cells and other factors pertinent to the present invention are set forth in my Patent No. 3,193,476.

Example 1

A catholyte was prepared containing 32.4 grams benzyldimethylsulfonium p-toluenesulfonate, 25 grams tetraethylammonium p-toluenesulfonate, 10 grams water and 110 ml. acrylonitrile. The catholyte was placed in a cell with 110 ml. mercury as cathode, a platinum anode, and a concentrated aqueous solution of tetraethylammonium p-toluenesulfonate as anolyte. The anolyte was in an alundum cup to separate it from the catholyte. A source of direct electric current was applied to the cell at about 30 volts across the cell to cause a 2 ampere current. The cathode voltage initially was —1.24 (vs. saturated calomel electrode) and gradually changed to —1.50 at the end of the 2½ hour electrolysis. Initially the catholyte was slightly alkaline but later became acidic, and a small amount of aqueous tetraethylammonium hydroxide was added to control the acidity. The catholyte was maintained at about 10° C. during the electrolysis. The electrolyte was extracted with methylene dichloride and the extracts washed with water and dried over calcium sulfate. Solvent and unreacted acrylonitrile were removed under vacuum to leave 2.7 grams of material, which was distilled through a micro apparatus to obtain γ-phenylbutyronitrile as the first fraction distilling, 128° C./8 mm., $n_D^{27}$ 1.5132. The compound had the same vapor phase retention time as an authentic sample of γ-phenylbutyronitrile, and a 50:50 mixture with this example also had this same retention time.

The sulfonium compound employed in the above electrolysis was prepared by mixing equimolar quantities of benzyl methyl sulfide and methyl p-toluenesulfonate, the benzyl methyl sulfide being obtained by reaction of benzyl mercaptan with methyl iodide in absolute ethanol with sodium methoxide.

Example 2

An electrolysis was conducted as described in Example 1, employing as catholyte 26.2 grams cyanomethyldimethylsulfonium p-toluenesulfonate, 25 grams tetraethylammonium p-toluenesulfonate, 130 ml. acrylonitrile, 3 ml. water, and a trace of p-nitrosodimethylaniline as polymerization inhibitor. The anolyte was 50% aqueous tetraethylammonium p-toluenesulfonate. The cathode voltage initially was —0.75 volt and it gradually changed to —1.5 volts at the end of the electrolysis. The current was 2 amperes during the early part of the electrolysis but dropped to 0.5 ampere at the end. The catholyte temperature was about 25° C. throughout the electrolysis. A few drops of triethylamine were occasionally added during the electrolysis to control acidity. The catholyte was extracted as described in Example 1, and 2.9 grams of viscous material was obtained after removal of solvents and acrylonitrile. The material was distilled, 1.5 ml. being collected at 102–108° C./2.2 mm., $n_D^{25}$ 1.4420, which was identified as primarily glutaronitrile by vapor phase chromatography.

The sulfonium salt employed in the above electrolysis was prepared by mixing cyanomethyl methyl sulfide and methyl p-toluenesulfonate and separating the salt by filtration, the final recrystallization being from ethanol, M.P. 122° C.

Example 3

Benxyldimethylsulfonium p-toluenesulfonate and acrylonitrile were electrolyzed as described in Example 1 with a catholyte of 32.4 grams of the sulfonium salt, 30 grams tetraethylammonium p-toluenesulfonate, 14 ml. triethylamine, 100 ml. acrylonitrile and 10 ml. water. The triethylamine was present to make the solution alkaline. The cathode voltage was −1.41 to −1.59 volts. Extraction of the catholyte and removal of solvent and acrylonitrile gave 4.2 grams of product which chromatography indicated to be mainly γ-phenylbutyronitrile. Upon distillation γ-phenylbutyronitrile was obtained as the main product, 122–132° C./7.8 mm., $n_D^{26}$ 1.5129.

Example 4

A catholyte was prepared from 24 grams β-cyanoethyltriphenylphosphonium bromide, 20 grams tetraethylammonium p-toluenesulfonate (vacuum oven-dried), 175 ml. redistilled dimethylformamide, 30 ml. redistilled styrene and a trace of hydroquinone. The anolyte was a saturated solution of the tetraethylammonium p-toluenesulfonate (vacuum oven-dried) in redistilled dimethylformamide. The electrolysis was conducted under nitrogen atmosphere at −1.5 to −1.8 cathode volts and a current of 1 ampere which dropped to 0.5 ampere and then 0.3 ampere at the end of the electrolysis which consumed about 2.42 ampere-hours. Hydroquinone was added to the catholyte which was then transferred to a separatory funnel and separated from mercury (employed as the cathode). A solid was filtered off and the filtrate was stirred into 600 ml. cold water and extracted with methylene chloride, washed with water, and dried over calcium sulfate. The solvents were removed under vacuum and styrene was distilled at 7 mm. to leave 21.5 grams of brown liquid which crystallized upon standing. The material was recrystallized from alcohol and the crystals washed with alcohol, the material having a melting point of 79–80° C., compared to 78.5 to 80° C. for a sample of triphenylphosphine. The mother liquors from the crystallization upon standing deposited another crop of crystals, which were removed by filtration. A sample of the filtrate was examined by vapor phase chromatography and found not to contain adiponitrile. The filtrate was distilled, a product being obtained at 99° C./7 mm. in an amount of 2–3 ml., $n_D^{24}$ 1.5122, which elemental analysis showed to be γ-phenylvaleronitrile.

*Analysis.*—Calcd. for $C_{11}H_{13}N$: C, 82.97; H, 8.23; N, 8.80. Found: C, 82.75; H, 8.33; N, 9.00.

Example 5

A catholyte was prepared from 97.4 grams β-cyanoethyltriphenylphosphonium p-toluenesulfonate, 130 ml. redistilled dimethylformamide, 30 ml. styrene. The anolyte was tetraethylammonium p-toluenesulfonate (recrystallized from acetone) in dimethylformamide. The electrolysis was conducted under nitrogen at a catholyte temperature of 15° C. with a 1.5 ampere current for 3.5 ampere-hours. The cathode voltage was −1.69 to −1.72 volts. Hydroquinone was added, and the catholyte was separated from the mercury cathode, diluted with water, extracted with methylene chloride, washed with water and dried over calcium sulfate. Volatile materials were removed by warming under vacuum to give 64.8 grams oil. The oil was stirred with ether and the ether decanted, a total of 300 ml. ether being employed portion-wise. The ether solution was heated on a water bath to remove the ether, leaving 29.5 grams of oil which solidified upon standing. The solidified material was treated with alcohol and the alcoholic solution was filtered to remove 18.1 grams of triphenylphosphine solids, M.P. 82–83° C. Upon evaporation of alcohol from the filtrate, an additional gram of solids precipitated. The remaining solvent was removed by warming under vacuum to give 7.6 grams of liquid which was distilled, 3.5 grams of γ-phenylvaleronitrile being collected at 77° C./0.2 mm. to 82° C./0.22 mm., $n_D^{23}$ 1.5115. A dimeric product was also obtained $(C_{11}H_{12}N_2)_2$, corresponding to the indicated phenylvaleronitrile but being dimerized at the carbon atom adjacent to the phenyl group.

Example 6

A catholyte was prepared from 93 ml. of acrylonitrile, 46.7 grams of carbetoxymethyltriphenylphosphonium bromide, 75 grams of tetraethylammonium p-toluenesulfonate and 18.7 grams water. A 10% solution of tetraethylammonium hydroxide in water was added to make the catholyte slightly basic. The anolyte was 30 ml. of a 50% aqueous solution of tetraethylammonium p-toluenesulfonate in water. The electrolysis was carried out at −1.6 cathode volts and a current of 1 ampere, which dropped to 0.5 ampere at the end of the electrolysis. Cooling was employed to keep the cell temperature at 25° C. A total of 5.15 ampere-hours was utilized in the electrolysis. Concentrated hydrochloric acid was added dropwise to the catholyte during the electrolysis to maintain the pH in the range of 7 to 7.5. The catholyte was diluted with water and the organic layer was separated. The aqueous layer was extracted with methylene chloride and the extracts added to the organic layer. The organic layer was washed with water and then distilled to remove methylene dichloride, acrylonitrile and ethyl acetate. The residue was extracted with benzene and the benzene solution treated with hexane to yield a yellow oil which was analyzed by vapor phase chromatography as being about 4 parts adiponitrile to 1 part ethyl 4-cyanobutanoate. The ethyl acetate obtained presumably resulted from protonation of the aliphatic group which separated from the phosphorus. Small amounts of triphenylphosphine were also isolated.

Example 7

Employing the conditions of Example 5, a solution of 25 grams of 4-cyanobutyltriphenylphosphonium bromide and 30 ml. of styrene in 200 ml. dimethylformamide was electrolyzed at a cathode potential of −1.6 volts and current of 0.5 ampere. The anolyte was diluted with water and the products obtained by ether extraction. The ether and solvents were removed by distillation and then an 0.28 gram fraction obtained at 110° C./3 mm. and a 1.46 gram fraction at 130° C./3 mm. The fractions were combined and ω-phenylanthonitrile was collected by vapor phase chromatography $n/_D^{23}$=1.5023.

Example 8

An electrolysis was conducted as in Example 7, but employing 3-cyanopropyltriphenylphosphonium bromide as the phosphonium salt and a cathode voltage of about −1.7 volts. The catholyte was diluted with water and extracted with ether, and ether and solvents removed by distillation. Cold ethanol solution was added to precipitate triphenylphosphine and the ethanol was then evaporated to leave a yellow oil. Distillation up to 110° C./2 mm. gave 1.1 grams of material having an infrared spectrum indicative of cyanoalkylbenzene. Hydrolysis of the material with aqueous sodium hydroxide gave a white solid, M.P. 93.5–94° C., consistent with the 94–6° C., melting point for the amide of 6-phenylcaproic acid reported in Journal American Chemical Society, vol. 82, page 4671. After acidification of the alkaline solution from which the amide was obtained, the corresponding acid was isolated by ether extraction, confirming the product as 6-phenylcapronitrile.

Among the salts which can be employed as supporting electrolytes in the present process, the amine and quaternary ammonium salts are generally suitable, especially those of sulfonic and alkyl sulfuric acids. Such salts can be the saturated aliphatic amine salts or heterocyclic amine salts, e.g. the mono-, di- or trialkylamine salts, or the mono-, di- or trialkanolamine salts, or the piperidine, pyrrolidine or morpholine salts, e.g. the ethylamine, dimethylamine or triisopropylamine salts of various acids, especially various sulfonic acids. Especially preferred are aliphatic and heterocyclic quaternary ammonium salts, i.e. the tetraalkylammonium or the tetraalkanolammonium salts or mixed alkyl alkanol ammonium salts such as the alkyltrialkanolammonium, the dialkyldialkanolammonium, the alkanoltrialkylammonium or the N-heterocyclic N-alkylammonium salts of sulfonic or other suitable acids. Further specific examples of suitable amine and ammonium cations will be given below in setting forth specific salts suitable for use in the present invention. The saturated aliphatic or heterocyclic quarternary ammonium cations in general have suitably high cathode discharge potentials for use in the present invention and readily form salts having suitably high water solubility with anions suitable for use in the electrolytes employed in the present invention. The saturated, aliphatic or heterocyclic quaternary ammonium salts are therefore in general well adapted to dissolving high amounts of olefinic compounds in their aqueous solutions and to effecting reductive couplings of such olefinic compounds. It is understood, of course, that it is undesirable that the ammonium groups contain any reactive groups which might interfere to some extent with the reductive coupling reaction. In this connection it should be noted that aromatic unsaturation as such does not interfere as benzyl substituted ammonium cations can be employed; (and also by aryl sulfonate anions).

Among the anions useful in the electrolytes employed in the present process the aryl and alkaryl sulfonic acids are especially suitable, for example, salts of the following acids: benzenesulfonic acid, o-, m- or p-toluenesulfonic acid, o-, m- or p-ethylbenzenesulfonic acid, o-, m- or p-cumenesulfonic acid, o-, m- or p-tert-amylbenzenesulfonic acid, o-, m- or p-hexylbenzenesulfonic acid, o-xylene-4-sulfonic acid, p-xylene-2-sulfonic acid, m-xylene-4 or 5-sulfonic acid, mesitylene-2-sulfonic acid, durene-3-sulfonic acid, pentamethylbenzenesulfonic acid, o-dipropylbenzene-4-sulfonic acid, alpha- or beta-naphthalene-sulfonic acid, o-, m- or p-biphenylsulfonic acid, and alpha-methyl-beta-naphthalenesulfonic acid. As explained heretofore, alkali metal salts are useful in the present invention with certain limitations, and the alkali metal salts of such sulfonic acids can be employed, i.e. the sodium, potassium, lithium, cesium or rubidium salts such as sodium benzenesulfonate, potassium p-toluenesulfonate, lithium o-biphenylsulfonate, rubidium beta-naphthalenesulfonate, cesium p-ethylbenzenesulfonate, sodium o-xylene-3-sulfonate or potassium pentamethyl-benzenesulfonate. The salts of such sulfonic acids may also be the saturated, aliphatic amine or heterocyclic amine salts, e.g. the mono- di- or trialkylamine salts, or the mono-, di- or trialkanolamine salts, or the piperidine, pyrrolidine, or morpholine salts, e.g. the ethylamine, dimethylamine or triisopropylamine salt of benzenesulfonic acid or of o-, p- or m-toluenesulfonic acid; the isopropanolamine, dibutanolamine or triethanolamine salt of o-, p- or m-toluenesulfonic acid or of o-, p- or m-biphenylsulfonic acid; the piperidine salt of alpha- or betanaphthalenesulfonic acid or of the cumenesulfonic acids, the pyrrolidine salt of o-, m- or p-amylbenzenesulfonate; the morpholine salt of benzenesulfonic acid, of o-, m- or p-toluenesulfonic acid, or of alpha- or beta-naphthalenesulfonic acid, etc. In general, the sulfonates of any of the ammonium cations disclosed generically or specifically herein can be employed in the present invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tetraalkylammonium hydroxide such as tetraethylammonium hydroxide there is obtained tetraethylammonium p-toluenesulfonate, use of which in the presently provided process has been found to give very good results. Other presently useful quaternary ammonium sulfonates are e.g. tetraethylammonium o- or m-toluenesulfonate or benzenesulfonate; tetraethylammonium o-, m- or p-cumenesulfonate or o-, m- or p-ethylbenzenesulfonate, tetramethylammonium benzenesulfonate, or o-, m- or p-toluenesulfonate; N,N-dimethyl-piperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alpha-ethyl-beta-naphthalenesulfonate; tetraethanolammonium o-, m- or p-cumenesulfonate or o-, m- or p-toluenesulfonate; tetrabutanolammonium benzenesulfonate or p-xylene-3-sulfonate; tetrapentylammonium o-, m- or p-toluenesulfonate or o-, m- or p-hexylbenzenesulfonate, tetrapentanolammonium p-cymene-3-sulfonate or benzenesulfonate; methyltriethylammonium o-, m- or p-toluenesulfonate or mesitylene-2-sulfonate; trimethylethylammonium o-xylene-4-sulfonate or o-, m- or p-toluenesulfonate; triethylpentylammonium alpha or beta-naphthalenesulfonate or o-, m- or p-butylbenzenesulfonate, trimethylethanolammonium benzenesulfonate or o-, m- or p-toluenesulfonate; N,N-di-ethylpiperidinium or N-methyl-pyrrolidinium o-, m- or p-hexylbenzenesulfonate or o-, m- or p-toluenesulfonate, N,N-diisopropyl or N,N-di-butylmorpholinium o-, m- or p-toluenesulfonate or o-, m- or p-biphenylsulfonate, etc.

Another especially suitable class of salts for use in the present invention are the alkylsulfate salts such as methosulfate salts, particularly the amine and quaternary ammonium methosulfate salts. Methosulfate salts such as the methyltriethylammonium, tri-n-propylmethylammonium, triamylmethylammonium, tri-n-butylmethylammonium, etc., are very hygroscopic, and the tri-n-butylmethylammonium in particular forms very concentrated aqueous solutions which dissolve large amounts of organic materials. In general the amine and ammonium cations suitable for use in the alkylsulfate salts are the same as those for the sulfonates.

Various other quarternary ammonium salts can be employed as supporting electrolyte, e.g. the halides, sulfates, phosphates, acetates and other carboxylic acid salts, benzoates, phosphonates, etc., specifically, for example, tetramethylammonium bromide, tetraethylammonium bromide, tetramethylammonium chloride, tetraalkyl phosphonium chloride, tetraethylammonium phosphate, etc., and similarly the alkali, alkaline earth and other metal salts with the foregoing anions can be employed, e.g. sodium chloride, potassium phosphates, sodium acetate, calcium acetate, lithium benzoate, calcium chloride, rubidium bromide, magnesium, chloride, as well as the sulfonic acid, particularly aromatic sulfonic acid, and alkylsulfuric acid salts of the foregoing cations and of other alkali, alkaline earth, rare earth and other metals, e.g. cesium, cerium, lanthanum, yttrium, particularly with anions to achieve sufficient water solubility. The aluminum cation is only somewhat inferior to sodium in respect to its discharge potential, but most salts of aluminum tend to hydrolyze in water and precipitate aluminum oxide. It is understood that the solutions designated herein as containing salts, electrolytes, etc., in specified amounts have reference to solutions containing salts sufficiently stable to remain in solution. It will be recognized that many cations are capable of existing in several valence states, and some valence states will be more suitable as supporting electrolytes than others. Other examples of salts which can be employed in the present process, although not necessarily with equivalent or optimum results, are barium bromide, barium acetate, barium propionate, barium adipate, cerium sulfate, cesium chloride, cesium benzoate, cesium benzenesulfonate, potassium oxalate, potassium sulfate, potassium ethyl sulfate, lanthanum acetate, lanthanium benzenesulfonate, sodium sulfate, sodium potassium sulfate, strontium acetate, rubidium sulfate, rubidium benzoate, trisodium phosphate, sodium hydrogen phosphate and sodium bicarbonate.

I claim:

1. The method of electrolytic reductive coupling which comprises electrolyzing a solution of ionic compounds selected from the group consisting of phosphonium and sulfonium compounds in which the phosphorus or sulfur atom of the compound bears an aliphatic substituent, and an olefin, the electrolysis of the solution occurring in contact with a cathode and the olefin not reducing at a cathode potential less negative than the ionic compound, and obtaining and recovering from the solution a coupled product in which the said aliphatic substituent is coupled to said olefin and the said olefinic bond has become saturated.

2. The method of claim 1 in which the ionic compound is a triarylphosphonium compound bearing a substituent on the phosphorus atom containing up to 10 carbon atoms and selected from the group consisting of cyanoalkyl, carbalkoxyalkyl, carbaryloxyalkyl, carboxamidoalkyl, acylalkyl, aldehydoalkyl, aralkyl, phosphonatoalkyl, phosphinatoalkyl, phosphine oxide alkyl and sulfonatoalkyl.

3. The method of claim 1 in which the ionic compound is a dialkylsulfonium compound bearing a substituent selected from the group consisting of cyanoalkyl, carbalkoxyalkyl, carbaryloxyalkyl, carboxamidoalkyl, acylalkyl, aldehydoalkyl, aralkyl, phosphonatoalkyl, phosphinatoalkyl, phosphine oxido alkyl and sulfonatoalkyl.

4. The method of claim 1 in which the olefin is selected from the group consisting of $\alpha,\beta$-olefinic carboxylates, nitriles, carboxamides, ketones and aldehydes, and aryl ethenes.

5. The method of claim 4 in which the aliphatic substituent is a cyanoalkyl group and it becomes coupled to the $\beta$-carbon of the olefin and hydrogen is added to the $\alpha$-carbon atom.

6. The method of claim 4 in which the aliphatic substituent is a carbalkoxyalkyl group and it becomes coupled to the $\beta$-carbon atom of the olefin and hydrogen is added to the $\alpha$-carbon atom.

7. The method of claim 1 in which a 2-cyanoethyltriphenylphosphonium salt is electrolyzed with styrene to produce $\gamma$-phenylvaleronitrile.

8. The method of claim 1 in which a benzyldialkylsulfonium salt is electrolyzed with acrylonitrile to produce $\gamma$-phenylbutyronitrile.

9. The method of claim 1 in which a cyanomethyldialkylsulfonium salt is electrolyzed with acrylonitrile to produce glutaronitrile.

10. The method of claim 1 in which a carbethoxymethyltriphenylphosphonium salt is electrolyzed with acrylonitrile to produce ethyl 4-cyanobutanoate.

11. The method of claim 1 in which a 4-cyanobutyltriphenylphosphonium salt is electrolyzed with styrene to produce $\omega$-phenylanthonitrile.

12. The method of claim 1 in which a 3-cyanopropyltriphenylphosphonium salt is electrolyzed with styrene to produce 6-phenylcapronitrile.

13. The method of claim 1 in which a divided cell is employed and the catholyte contains a supporting electrolyte salt.

14. The method of claim 1 in which the pH is maintained in the range of about 7 to 9.5.

15. The method of claim 1 in which the catholyte contains no more than 10% by weight water.

16. The method of claim 1 in which the catholyte is substantially anhydrous.

References Cited

UNITED STATES PATENTS 3,193,478   7/1965   Baizer.
3,193,479   7/1965   Baizer.

HOWARD S. WILLIAMS, *Primary Examiner.*

H. M. FLOURNOY, *Assistant Examiner.* N

U.S. Cl. X.R.

204—59